United States Patent
Adada et al.

(10) Patent No.: US 12,223,003 B2
(45) Date of Patent: Feb. 11, 2025

(54) STREAMING OF CHAT IN SERP

(71) Applicant: Microsoft Technology Licensing, LLC, Redmond, WA (US)

(72) Inventors: Mahmoud Adada, Redmond, WA (US); Elbio Renato Torres Abib, Bellevue, WA (US); Bradley Moore Abrams, Redmond, WA (US); Justin Daniel Harris, Ontario (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/336,000

(22) Filed: Jun. 15, 2023

(65) Prior Publication Data
US 2024/0256618 A1 Aug. 1, 2024

Related U.S. Application Data

(60) Provisional application No. 63/442,450, filed on Jan. 31, 2023.

(51) Int. Cl.
*G06F 16/9536* (2019.01)
*G06F 40/20* (2020.01)

(52) U.S. Cl.
CPC .......... *G06F 16/9536* (2019.01); *G06F 40/20* (2020.01)

(58) Field of Classification Search
CPC .......... G06F 40/30; G06F 40/56; G06F 40/40; G06F 16/9535; G06F 16/90332; G06N 5/022; G06N 20/00; G06N 3/0455; G06N 3/0475; G06N 3/02
See application file for complete search history.

(56) References Cited

U.S. PATENT DOCUMENTS

| 11,769,017 B1 * | 9/2023 | Gray .................. G06F 16/3328 704/9 |
| 2009/0319533 A1 | 12/2009 | Tengli |
| 2023/0104655 A1 * | 4/2023 | Amarasingham ...... G16H 15/00 705/2 |

OTHER PUBLICATIONS

Generative AI with Cohere written by Meor Amer (hereafter Amer), Dec. 8, 2022 (Year: 2022).*
International Search Report and Written Opinion received for PCT Application No. PCT/US2024/010236, Apr. 5, 2024, 13 pages.

* cited by examiner

*Primary Examiner* — Hau H Hoang
(74) *Attorney, Agent, or Firm* — Calfee, Halter & Griswold LLP

(57) ABSTRACT

A computing system is disclosed that includes a processor and memory. The memory stores instructions that, when executed by the processor, cause the processor to perform several acts. The acts include generating a prompt that is to be input to a generative language model. The prompt includes conversational input set forth by a user. The acts further comprise providing the prompt as input to the generative language model, and receiving conversational output from the generative language model, where the generative language model generated the conversational output based upon the prompt. Additionally, the acts comprise streaming the conversational output on one of a SERP or webpage to which the user has navigated from the SERP.

20 Claims, 8 Drawing Sheets

STREAMING OF CHAT IN SERP

RELATED APPLICATION

This application claims priority to U.S. Provisional Patent Application No. 63/442,450, filed on Jan. 31, 2023, and entitled "STREAMING OF CHAT IN SERP", the entirety of which is incorporated herein by reference.

BACKGROUND

A conventional computer-implemented search engine is configured to receive a search query and infer an information retrieval intent of a user who issued the query (for example, ascertain whether the user wants to navigate to a specific page, whether the user intends to purchase an item or service, whether the user is looking for a fact, whether the user is searching for an image or video, etc.). The search engine identifies results based upon the inferred information retrieval intent and returns a search engine results page (SERP) to a computing device employed by the user. The SERP can include links to webpages, snippets of text extracted from the webpages, images, videos, knowledge cards (graphical items that include information about an entity such as a person, place, company, etc.), instant answers (a graphical item depicts an answer to a question set forth in the query), widgets (such as graphical calculators that can be interacted with by the user), supplemental content (e.g., advertisements that are related to the query), and so forth.

While search engines are frequently updated with features that are designed to improve user experience (and to provide increasingly relevant results to users), search engines are not well-equipped to provide certain types of information. For example, search engines are not configured to provide output that requires reasoning over content of a webpage or output that is based upon several different information sources. For instance, upon receipt of a query "how many home runs did Babe Ruth hit before he turned 30" from a user, a conventional search engine returns a knowledge card about Babe Ruth (which may depict an image of Babe ruth, a birthdate, etc.), suggested alternate queries (such as "how many hits did Babe Ruth have in his career?"), links to webpages that include statistics, amongst other information. To obtain the answer, the user must access a webpage that includes statistics and compute the answer themselves.

In another example, upon receipt of a query "provide me with a list of famous people born in Seattle and Chicago", a conventional search engine returns knowledge cards about the cities Chicago and Seattle, a link to a first webpage that includes a list of people from Chicago, and a link to a second webpage that includes a list of people from Seattle. The search engine, however, is unable to reason over content of the two webpages to produce a list that includes identities of people from both Chicago and Seattle.

Relatively recently, generative language models (GLMs) (also referred to as large language models (LLMs)) have been developed. An example of a GLM is the Generative Pre-trained Transformer 3 (GPT-3). Another example of a GLM is the BigScience Language Open-science Open-access Multilingual (BLOOM) model, which is also a transformer-based model. Briefly, a GLM is configured to generate an output (such as text in human language, source code, music, video, and the like) based upon a prompt set forth by a user and in near real-time (e.g., within a few seconds of receiving the prompt). The GLM generates content based upon training data over which the GLM has been trained. Accordingly, in response to receiving the prompt "how many home runs did Babe Ruth bit before he turned 30", the GLM can output "Before he turned 30, Babe Ruth hit 94 home runs." In another example, in response to receiving the prompt "provide me with a list of famous people born in Seattle and Chicago", the GLM can output two separate lists of people (one for Seattle and one for Chicago), where the list of people born in Chicago includes Barrack Obama. In both these examples, however, the GLM outputs information that is incorrect—for instance, Babe Ruth hit more than 94 home runs before he turned 30, and Barrack Obama was born in Hawaii (and not Chicago). Accordingly, both conventional search engines and GLMs are deficient with respect to identifying and/or generating appropriate information in response to certain types of user input.

SUMMARY

The following is a brief summary of subject matter that is described in greater detail herein. This summary is not intended to be limiting as to the scope of the claims.

Various technologies are described herein that relate to providing, by a GLM, streaming content in a SERP and/or on a webpage provided in the SERP. Information provided as input to a GLM that is used by the GLM to generate output is referred to as a prompt. In accordance with technologies described herein, the prompt used by the GLM to generate output can include: 1) user input, such as a query; and 2) information from a webpage being viewed by the user or information retrieved by a search engine. The prompt can also include previous dialog turns, as will be described in greater detail herein.

In an example, a browser of a client computing device loads a search engine webpage, and the browser receives a query set forth by a user of the client computing device. The browser transmits the query to a computing system that executes a search engine, and the search engine identifies search results and generates a search engine results page (SERP) based upon the query. The search results can include webpages related to the query, a knowledge card, an instant answer, entity description, supplemental content, and so forth. The search engine returns the SERP to the browser, whereupon the SERP is displayed on a display of the client computing device when the client computing device.

In another example, the system organizes and summarizes information from a classical retrieval-based search engine into a semantically meaningful format, so that the information becomes more comprehensible and navigable for search engine users. It does so by first creating a summary that provides an overview of the information from e.g., the top N (e.g., 10, or some other number) search results, and then creates disambiguated subsections about different aspects of the original search query based on its intent. These subsections use citation links to attribute the summarized information to their sources to provide credibility. The goal of the system is to help users quickly find and understand the information they are looking for by providing a curated and structured view of the search engine results page.

The system retrieves relevant information from a search engine based on a user's search query. The system then leverages a GLM to summarize the content according to the intent detected from the query. In some cases, the system may generate a direct answer to the query and provide relevant references to support the information. Additionally, the system provides a brief overview of the main facts or aspects related to the user's query, using information from reference documents. The model has access to data such as the date and location of the query, as well as the top N web results and surrounding information for each result. The users input a search query, then the system will use a search engine to retrieve relevant web pages, then use a large language model to detect user's intent, summarize content from retrieved documents generate a direct answer, format generated content (bolding text, cluster content under different headers), cite the reference documents, provide a brief overview of the main facts, events, or aspects of the user's query based on the information from the reference documents. The model is provided: date and location info, and Top N web results with relevant passages within those results.

The system described herein goes beyond the capabilities of a classical search engine by summarizing and generating answers to user input, as well as providing a brief overview of the main facts, aspects or other disambiguation related to the query. Classical search engines typically only retrieve and rank relevant content based on the user's query, without providing additional information or analysis. The described systems and methods achieve the new capabilities by leveraging large language models.

In an example, the search engine receives the query "how many home runs did Babe Ruth hit before he turned 30", and search results identified by the search engine include the birthdate of Babe Ruth and statistics for Babe Ruth by season. The GLM obtains such information as part of the prompt along with the aforementioned query. Because the prompt includes season by season home run totals for Babe Ruth, the GLM reasons over such data and provides output that is based upon the information identified as being relevant to the query by the search engine. Accordingly, the GLM can output "Babe Ruth hit 284 home runs before he turned 30." This information can be streamed into a chat window presented on or alongside a SERP that is being viewed by the user. In another example, the chat window is presented next to a webpage to which the user has navigated from the SERP.

The technologies described herein exhibit various advantages over conventional search engine and/or GLM technologies. Specifically, through integration with a GLM, a search engine is able to provide information to end users that conventional search engines are unable to provide. In addition, the GLM described herein is provided with information obtained by the search engine to use when generating outputs, thereby reducing the likelihood of the GLM issuing factually incorrect or irrelevant output.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
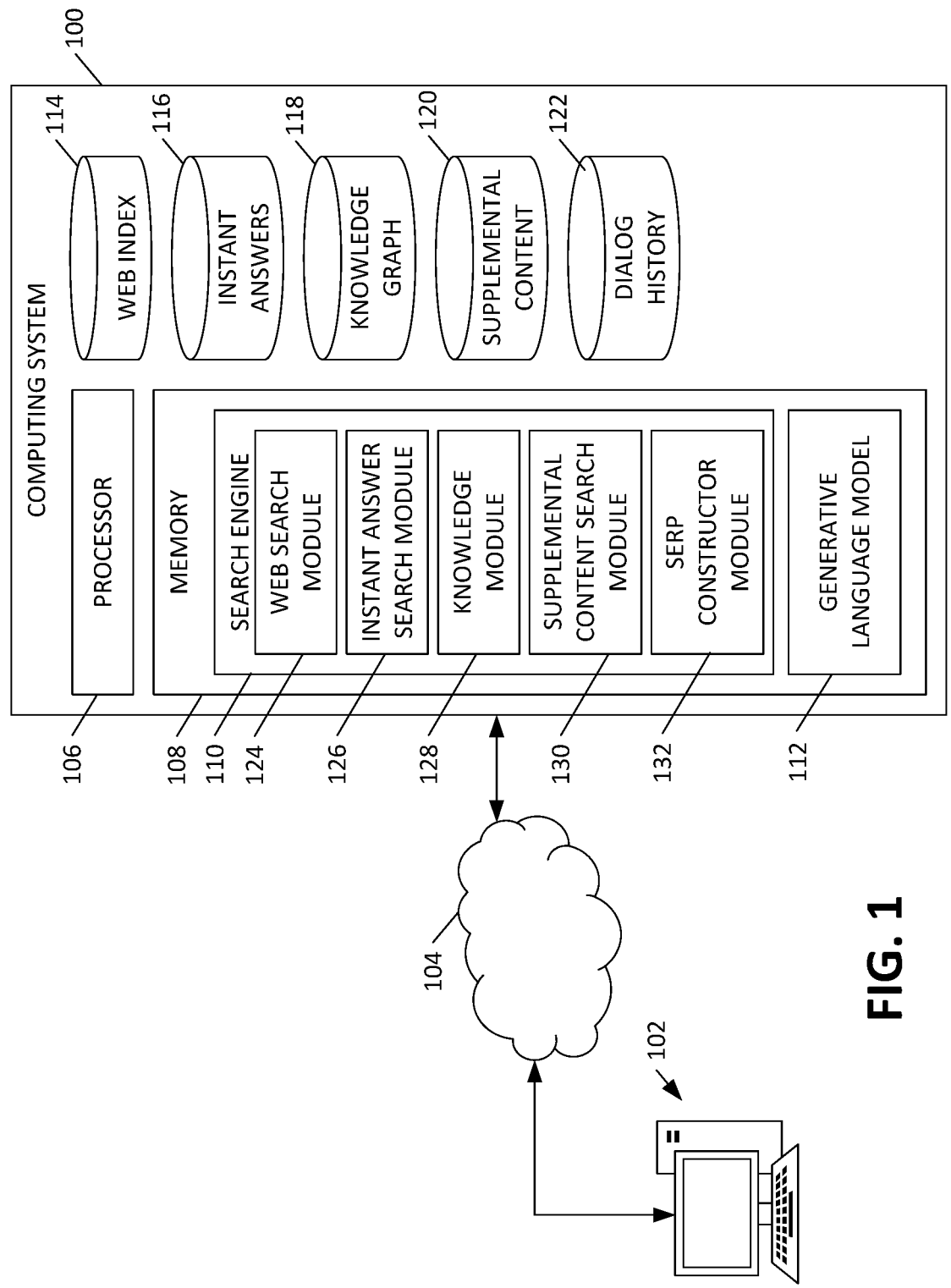
FIG. 1 shows a functional block diagram of a computing system, in accordance with various aspects described herein.

Various technologies pertaining to streaming information from a GLM into a SERP on a computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality described as being carried out by certain system components may be performed by multiple components. Similarly, for instance, a component may be configured to perform functionality described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies pertaining to providing streaming chat in a SERP and/or related webpage using a search engine and a generative language model (GLM), also referred to as a large language model (LLM). The described systems and methods permit a Search Engine Results Page (SERP) to enable streaming content, in particular streaming result summaries, streaming layout and composition, and streaming chat/dialogue from generative language models (GLMs), and more broadly, streaming from any model or content source such as images, video generators, speech and other chained or pipelined models. In another example, real-time conditioned (adaptive) text generation is provided, which allows the response to adapt to dynamic events, along with other model-level streaming optimizations.

GLMs can take on the order minutes to generate a response. Typical GPU load times for a prompt is on the order of 1000 tokens per second and output generation times are on the order of 5-10 tokens per second. A typical token on average consists of roughly 3 Latin characters in English. A prompt may be 2000 tokens and a response may be 1000 tokens. These times are too slow for serving responses on search engines which traditionally return in at most a couple of seconds. Furthermore, many prompts are chained in that they call sub-prompts, make API calls, invoke search engines, etc. to gather and compose information, which adds more end-to-end latency. In accordance with various aspects herein, a number of user interface, user experience and systems-level innovations are defined that mitigate much of this latency.

Referring now to FIG. 1, a functional block diagram of a computing system 100 is illustrated, in accordance with various aspects described herein. While illustrated as a single system, it is to be understood that the computing system 100 can include several different server computing devices, can be distributed across data centers, etc. The computing system 100 is configured to obtain information based upon a query set forth by a user and is further configured to provide the obtained information as a portion of a prompt to a GLM.

A client computing device 102 operated by a user (not shown) is in communication with the computing system 100 by way of a network 104. The client computing device 102 can be any suitable type of client computing device, such as a desktop computer, a laptop computer, a tablet (slate) computing device, a video game system, a virtual reality or augmented reality computing system, a mobile telephone, a smart speaker, or other suitable computing device.

The computing system 100 includes a processor 106 and memory 108, where the memory 108 includes instructions that are executed by the processor 106. More specifically, the memory 108 includes a search engine 110 and a GLM 112, where operations of the search engine 110 and the GLM 112 are described in greater detail below. The computing system 106 also includes data stores 114-122, where the data stores 114-122 store data that is accessed by the search engine 110 and/or the GLM 112. With more particularity, the data stores 114-122 include a web index data store 114, an instant answers data store 116, a knowledge graph data store 118, a supplemental content data store 120, and a dialog history data store 122. The web index data store 114 includes a web index that indexes webpages by keywords included in or associated with the webpages. The instant answers data store 116 includes an index of instant answers that are indexed by queries, query terms, and/or terms that are semantically similar or equivalent to the queries and/or query terms. For example, the instant answer "2.16 meters" can be indexed by the query "height of Shaquille O'Neal" (and queries that are semantically similar or equivalent, such as "how tall is Shaquille O'Neal").

The knowledge graph data store 118 includes a knowledge graph, where a knowledge graph includes data structures about entities (people, places, things, etc.) and their relationships to one another, thereby representing relationships between the entities. The search engine 110 can use the knowledge graph in connection with presenting entity cards on a search engine results page (SERP). The supplemental content data store 120 includes supplemental content that can be returned by the search engine 110 based upon a query.

The dialog history data store 122 includes dialog history, where the dialog history includes dialog information with respect to users and the GLM 112. For instance, the dialog history can include, for a user, identities of conversations undertaken between the user and the GLM 112, input provided to the GLM 112 by the user for multiple dialog turns during the conversation, responses in the conversation generated by the GLM 112 in response to the inputs from the user, queries generated by the GLM during the conversation that are used by the GLM 112 to generate responses, and so forth. In addition, the dialog history can include context obtained by the search engine 110 during conversations; for instance, with respect to a conversation, the dialog history 122 can include content from SERPs generated based upon queries set forth by the user and/or the GLM 112 during the conversation, content from webpages identified by the search engine 110 based upon queries set forth by the user and/or the GLM 112 during the conversation, and so forth. The data stores 114-122 are presented to show a representative sample of types of data that are accessible to the search engine 110 and/or the GLM 112; it is to be understood that there are many other sources of data that are accessible to the search engine 110 and/or the GLM 112, such as data stores that include real-time finance information, data stores that include real-time weather information, data stores that include real-time sports information, data stores that include images, data stores that include videos, data stores that include maps, etc. Such sources of information are available to the search engine 110 and/or the GLM 112.

The search engine 110 includes a web search module 124, an instant answer search module 126, a knowledge module 128, a supplemental content search module 130, and a SERP constructor module 132. The web search module 124 is configured to search the web index data store 114 based upon queries received by users, queries generated by the search engine 110 based upon queries received by users, and/or queries generated by the GLM 112 based upon interactions of users with the GLM 112. Similarly, the instant answer search module 126 is configured to search the instant answers data store 116 based upon queries received by users, queries generated by the search engine 110 based upon queries received by users, and/or queries generated by the GLM 112 based upon interactions of users with the GLM 112. The knowledge module 128 is configured to search the knowledge graph data store 118 based upon queries received by users, queries generated by the search engine 110 based upon queries received by users, and/or queries generated by the GLM 112 based upon interactions of users with the GLM 112. Likewise, the supplemental content search module 130 is configured to search the supplemental content data store 120 based upon queries received by users, queries generated by the search engine 110 based upon queries received by users, and/or queries generated by the GLM 112 based upon interactions of users with the GLM 112.

The SERP constructor module 132 is configured to construct SERPs based upon information identified by searches performed by the modules 124-130; for instance, a SERP can include links to webpages identified by the web search module 124, an instant answer identified by the instant answer search module 126, an entity card (that includes information about an entity) identified by the knowledge module 128, and supplemental content identified by the supplemental content search module 130. Further, a SERP may include a widget, a card that depicts current weather, and the like. The SERP constructor module 132 can also generate structured, semi-structured, and/or unstructured data that is representative of content of the SERP or a portion of the content of the SERP. For instance, the SERP constructor module 132 generates a JSON document that includes information obtained by the search engine 110 based upon one or more searches performed over the data stores 114-120 (or other data stores). In an example, the SERP constructor module 132 generates data that is in a structure/format to be used as a portion of a prompt by the GLM 112.

As discussed above, operation of the search engine 110 is improved based upon the GLM 112, and operation of the GLM 112 is improved based upon the search engine 110. For instance, the search engine 110 is able to provide outputs that the search engine 110 was not previously able to provide (e.g., based upon outputs generated by the GLM 112), and the GLM 112 is improved by using information obtained by the search engine 110 to generate outputs (e.g., information identified by the search engine 110 can be included as a portion of a prompt used by the GLM 112 to generate outputs). Specifically, the GLM 112 generates results based upon information obtained by the search engine 110 that have a higher likelihood of being accurate when compared to results generated by GLMs 112 that are not based upon such information, as the search engine 110 is associated with years of design to curate information sources to ensure accuracy thereof.

Figure 2:
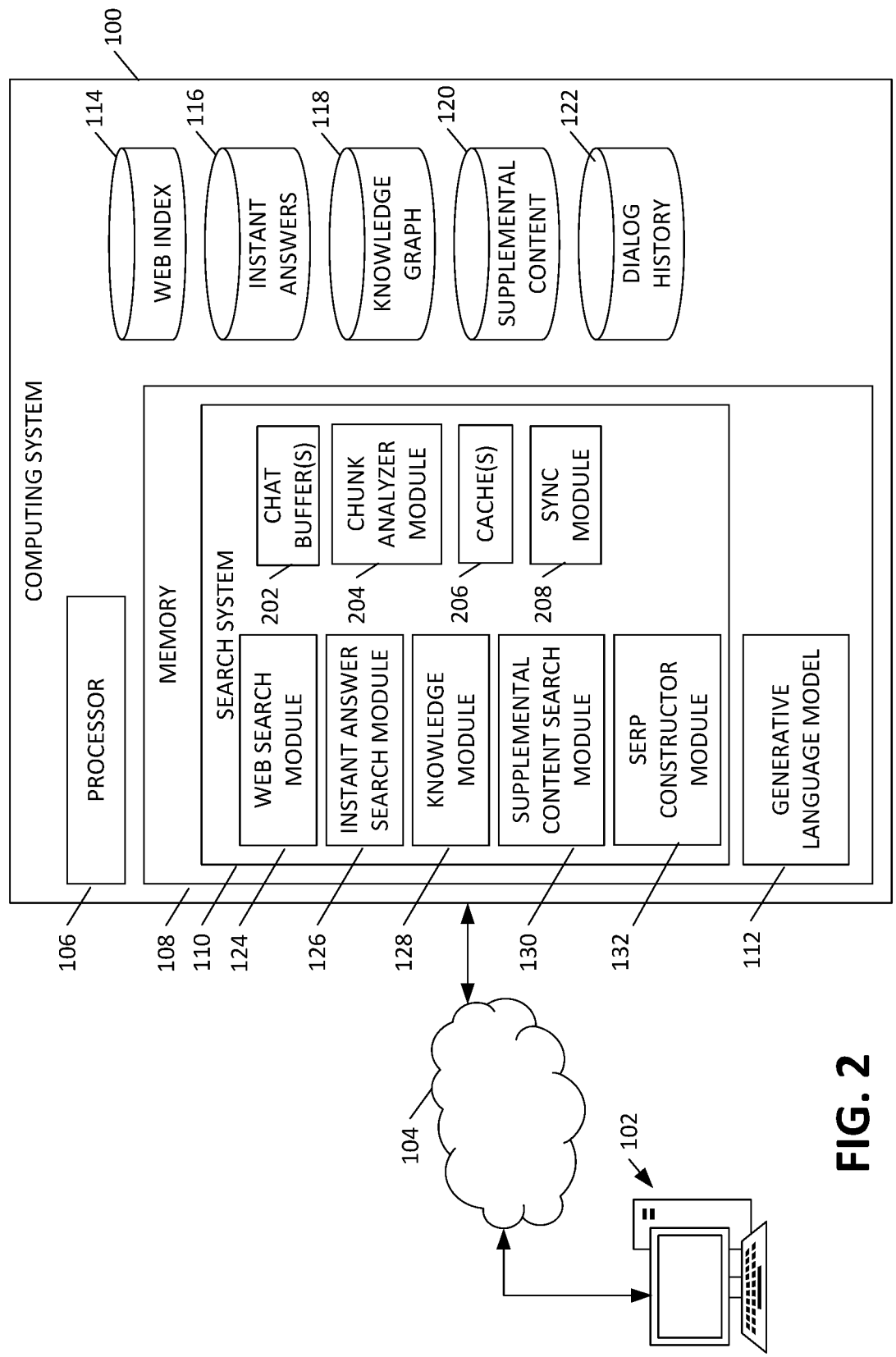
FIG. 2 illustrates the computing system with additional elements for providing streaming chat in a SERP or webpage.

With continued reference to FIG. 1, FIG. 2 illustrates the computing system 100, which, as described with regard to FIG. 1, includes the processor 106 and memory 108, where the memory 108 includes instructions that are executed by the processor 106. More specifically, the memory 108 includes the search engine 110 and the GLM 112, where operations of the search engine 110 and the GLM 112 are described in greater detail above with regard to FIG. 1. The computing system 106 also includes the data stores 114-122, where the data stores 114-122 store data that is accessed by the search engine 110 and/or the GLM 112 as described above.

The search engine 110 includes the web search module 124, the instant answer search module 126, the knowledge module 128, the supplemental content search module 130, and the SERP constructor module 132.

In addition to the elements set forth with regard to FIG. 1, the computing system of FIG. 2 comprises one or more chat buffers 202 that store response data (e.g., text, images, video, graphics, etc.) received from the GLM 112 for transmission to the client computing device 102 in response to a user query. Response data is used by the SERP constructor module 132 to generate the SERP, including summary information, an instant answer, entity description, search results, supplemental content, etc., a streaming conversation with the user. Prior to transmitting the response data to the client device 102, the response data is parsed or chunked into data subsets for streaming transmission. A chunk analyzer module 204 analyzes each data chunk to identify offensive content (e.g., language, images, etc.). If offensive content is identified, the offensive content can be removed prior to transmission of the chunk to the client device 102. In another embodiment the entire chunk can be removed, or the entire set of response data to which the chunk belongs can be removed. In these cases, the search system can reinitiate a search for responding to the user's query.

The search system also comprises one or more caches 206, which cache user inputs and responses generated by the GLM 112 so that responses to user inputs set forth relatively often are readily available. This feature improves response time. Additionally, the search system includes a synchronization module 208, which synchronizes multiple data streams being rendered using metadata or the like.

It will be understood that the various databases described herein with regard to FIGS. 1 and 2 store cached information such as, e.g., cached web pages or other data sources for responding to chat queries and/or providing search results or other information in the SERPs provided to the client device. Cached webpages are periodically updated and/or invalidated in order to maintain up-to-date source data.

Figure 3:
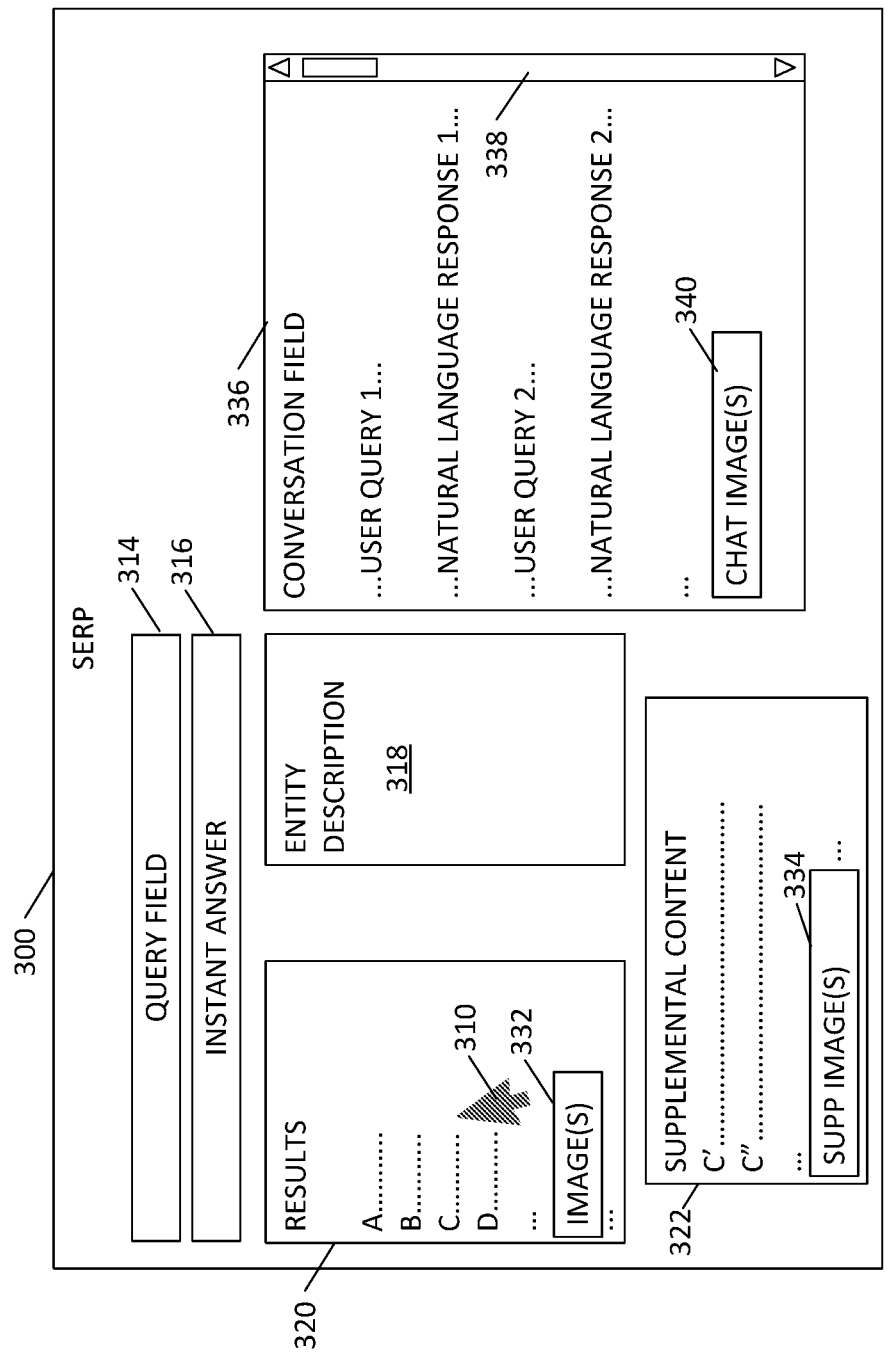
FIG. 3 illustrates a GUI of an operating system installed on a client computing device, in accordance with various aspects described herein.

Referring now to FIG. 3, a schematic that depicts a GUI 300 of a SERP displayed on a client computing device is illustrated, in accordance with various aspects described herein. The computing device can be any suitable computing device, including but not limited to a desktop computing device, a laptop computing device, a tablet computing device, a mobile telephone, a wearable computing device (including a watch or headgear), etc.

A pointer 310 can be employed in connection with selecting graphical elements displayed in the GUI 300, where position of the pointer 310 is based upon a corresponding position of a mouse, position of the gaze of a user relative to the display, position of a digit on a touch-sensitive display, etc.

The SERP includes an input field 314 into which a user may set forth user input. The user input is submitted to a search engine (not shown) that returns an instant answer 316 (if applicable), an entity description 318 (if applicable), one or more search results 320, and supplemental content 322. The instant answer 316 is, for instance, an answer supplied by the search engine in response to the query, without the user having to navigate away from the search results 320. The instant answer can be an answer that was previously verified and cached in response to the same user input.

It will be understood that the illustrated orientation of the input field 314, the instant answer 316, the entity description 318, the search results 320, and the supplemental content 322 relative to each other is presented by way of example only and is not intended to limit the particular arrangement of these elements within the SERP. For instance, the input field 314 may be presented below the results 320 and the entity description 318. In another example, the position of the instant answer 316 may be swapped with the position of the entity description 318. In another example, the query field 314, instant answer 316, entity description 318, results 320, and supplemental content 322 may be presented as a vertical stack of fields, in any order.

In one embodiment, the user can hover the pointer 310 over a particular result in the results field 320 and the system will retrieve and present in the supplemental content field 322 additional content related to the result over which the pointer is hovered. In another embodiment, when the user hovers the pointer over a particular result, a pop-up window is displayed showing the source of the information and/or supplemental information such as an ad (image or video) presented on the source page. The hover content may be generated based upon the contents of the paragraph and the context around the links along with the query. This content may be generated in parallel calls that are streamed in asynchronously from the main content.

In the example of FIG. 3, the user has hovered the pointer over search result C, and the system has retrieved supplemental content C' and C'' related to search result C.

The SERP 312 also comprises a conversation field 336 in which the user can have a dialog with the GLM 112 (FIGS. 1 and 2). The conversation field 336 shows user inputs and natural language responses provided to the user. Conversation field 336 also comprises a slider bar 338 via which the user can scroll up and down within the conversation field. Additionally, one or more chat images 340 can be included in the conversation field 336, where the chat images 340 relate to various natural language responses provided by the system.

For instance, user input is submitted to the GLM 112 (FIG. 1), which returns a natural language response, an image, or the like as an answer to the user query. The user is permitted then to respond to the response provided by the GLM 112 as though having a conversation with another human. The GLM 112 then provides a second natural language response to the user and the conversation continues. Meanwhile the user can hover the pointer 310 over one or more of the natural language responses provided by the GLM 112 (see FIG. 1) and the system will form and submit queries to return supplemental content 322 for presentation on the GUI 300. The supplemental content 322 typically includes one or more selectable links to articles or web pages related to the natural language response over which the pointer 310 is hovered and may also include one or more supplemental images 334. In another embodiment, the supplemental images 334 are shown as chat images 340 in the conversation field 336. The slider bar 328 is provided within the supplemental content field 322 and permits the user to scroll through the supplemental content and or images 334 in the supplemental content field.

In another embodiment, wherein the client computing device comprises a touch screen, the user can simply swipe upward or downward using a finger, stylus, or other device. In this embodiment slider bars 324, 326, 328, and 330 become optional. Alternatively, the slider bars may be retained, or may be displayed when the user's finger or stylus is in contact with the screen in one of the results field 320, the entity description field 318, the supplemental content field 322, or the main display area 304, respectively. When the user disengages the touch screen, the respective slider bar disappears.

In another embodiment, the client computing device 302 comprises a microphone and one or more speakers (not shown) for communicating with the search engine and/or the GLM.

Figure 4:
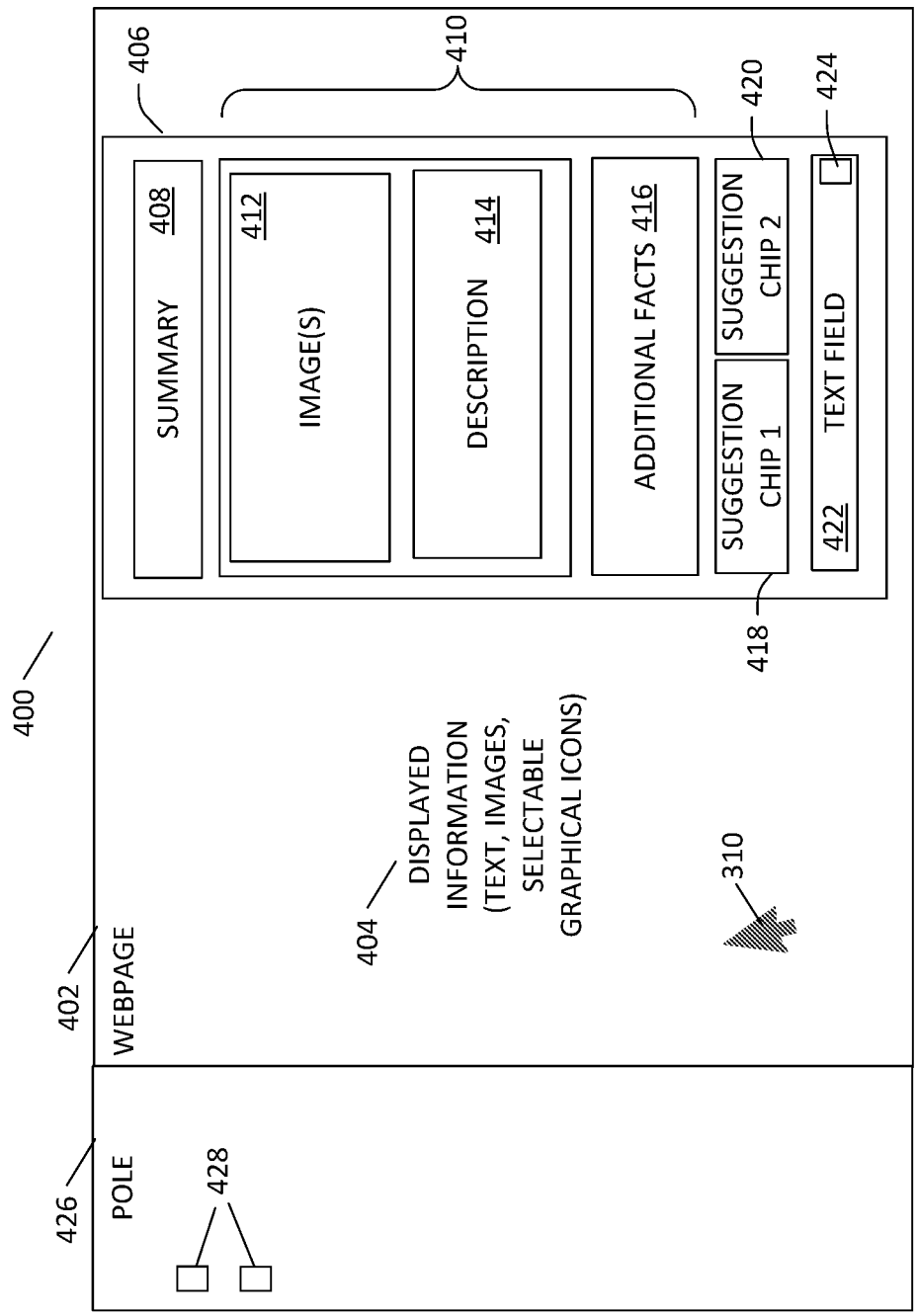
FIG. 4 depicts the GUI displaying a streaming semantic SERP, in accordance with various aspects described herein.

Referring now to FIG. 4, another GUI 400 of a webpage is illustrated, where the webpage is presented, in an example, upon a search result corresponding to the webpage being selected. On the web page is displayed information 404 comprising, e.g., text, images, selectable graphical icons, etc. Additionally, overlaid on the web page 402 is a semantic SERP 406 constructed by the GLM 112.

The semantic SERP 406 comprises several regions, including a summary field 408 and a summary area 410 that comprises (optionally) one or more images 412, text description 414, and additional facts 416. The semantic SERP 406 also comprises suggestion chips 418, 420 and a text field 422 into which the user can enter text input either manually or by voice. Additionally, a graphical icon for a microphone 424 is provided. When the user selects the microphone icon 424 the user can speak a query into the text field. the semantic SERP 406 is described in greater detail by way of example below.

According to an example, a user enters input about Rome, and the search engine 110 returns a search result that corresponds to a webpage, which can be selected by the user.

The summary field 418 can be generated to say: "Looks like you're interested in Rome. Let me share with you the history of how the Eternal City came to be:". In one example, the text presented to the user is streamed onto the user's display, such that it appears as though it is being typed out in real-time. In the summary area 410, one or more images 412 of Rome can be presented along with some description 414 of the history of Rome. For instance, the description 414 can be generated to read: "Overview of the history of Rome: a fascinating and complex topic that spans thousands of years and covers the rise and fall of one of the most influential civilizations ... see more". The phrase "see more" at the end of the description text is clickable by the user to reveal to the user additional description.

Additional facts or insights can be displayed in the additional facts field 416. For instance, text can be generated and displayed by the GLM 112 such as "Rome was founded in 753 BC by the twins Romulus and Remus. Rome became the capital of Italy in 1870 and has been so ever since." These additional facts can be listed, numbered, bulleted, etc. Additionally, source information can be provided in the additional effects field 416. E.g., "Sources: rome.net, wikipedia.org". Additionally or alternatively, the source information can be revealed in a pop-up or text bubble that appears when the user hovers the pointer 310 over the fact(s).

Also provided in the semantic SERP 406 are suggestion chips 418, 420 that the user can click on to be taken to additional information. For instance, the suggestion chip 418 may have text on it that reads "historical events in Rome", while the suggestion shipped 420 displays text that reads "historical sites in Rome". The GLM 112 generates the suggestion chips based upon user input, content of the webpage, and so forth.

The summary 406 is a conversational response generated by the GLM 112 to the user-entered input. This response is short, informative and illustrates the reasoning capabilities of the system. When rendered, a "pole" section 426 on the left side of the screen displays a row of "Suggestion Pills" 428, which are conversation starters generated by the GLM 110. Clicking on any of the suggestion pills takes users into conversation mode with the selected user input as the user turn and shows the chatbot response.

Suggestion pills represent suggestions that are creative and help continue the conversation. Such suggestions are typically related to ideas and concepts that immediately follow the current concept. Thus, they are heavily personalized using the suggestions that the users has consumed so far. Unlike PAA or RS, conversation enablers are somewhat informal and carry context for longer time steps. They can also contain anaphoric references to current inputs. E.g., if the input is "what is the best time to visit grand canyon", the pill may be "how do I reach the grand canyon visitor center". Current technology shows the following kinds of suggestions: query auto-completions, people also ask questions, related searches. The main goal is to help user find what they are looking for quickly. The goal for conversation enablers is to engage the user in longer sessions by motivating users to explore more by suggesting extremely interesting recommendations that cause the user to enter into a conversation with the GLM and thereby learn a lot in the process. In one embodiment, conversation enablers can be long suggestions compared to current suggestions which are typically short. In some ways, the idea is to generate idea paths for various concepts. Based on a current state of the user on the idea path, propose the next idea on that path. For example, a user may have searched and read webpages about ideas like "an artificial neuron" and "multi-layered perceptrons". Around this concept of deep learning, it may be desirable to show ideas like "convolutional neural networks" or "recurrent neural networks" to the user. The next pill is generated keeping the previously proposed pills, consumed pills, and previous user queries. Thus, the pill generator betakes much richer context. The conversation enabler pill should not be a bland response, such as "Sounds good", "Looks ok," etc.

The SERP conversation is grounded with the information in the pole 426 (e.g., Story, Creative content, Semantic SERP, etc.) A semantic SERP "peek" can be provided for certain inputs to illustrate the reasoning power of the GLM 112. E.g., the user is shown a peek (a small set) of the semantic SERP 406. This is a highly visual story-like experience where the classic SERP data is reasoned over, re-organized and flowed into a visual story like experience with a summary 410 that entices the user to engage to see analysis and links in each category. The semantic SERP "streams" in word by word drawing users attention that something active is happening on the page. In one embodiment, the semantic SERP can be maintained at a constant size after page load time without user input to mitigate jarring the page.

The system generates content that visually streams in character by character, token by token, word by word or segment by segment. The system back end can segment chunks to speak or display while streaming. This feature reduces TTS latency. Results can be streamed in at the stochastic rate at which they arrive. In another embodiment, controlled generation that uses a buffer of content is performed. The system may return text word by word or may speak the response word by word.

Streaming output from one model may feed into another. E.g., text produced by the model my stream into the Responsible AI (RAI) component which then streams into the speech generation model, etc.

As the bot is reading a story or generating content, there may be a dynamic pane that updates along with the stream. E.g., if it is reading a story, there may be a side pane that displays an image generated by a generative model pertaining to the current paragraph that is being streamed. Similarly an Ads pane can update ads based on what is currently being streamed in another stream (e.g., main topic summary). The multiple streams may be synchronized in time as they are being rendered.

The SERP need not be a one-shot GET request, but contains dynamic content that is continually fetched and updated by the GLM. A connection to the server may be maintained until the user navigates away completely. Images/ads may be rotated as they are generated. Streaming supports left-to-right and right-to-left languages.

Speculative pre-fetching of next inputs given the user conversation is supported. E.g., "I thought you might ask that." Precomputed/pre-aggregated results are also provided in cache(s) that are semantically matched. Retrospective fact checking is provided, e.g., letting the user know that the bot's views have changed with new info.

Other features include: streaming of results for smart find on the current page contents; streaming results for long documents shown in a web browser for side pane to send chunks of the current page to the model; a Map Reduce paradigm using LLM; Iterative refinement of summary answer(s) to user as results come in; Different parts of the page that match the query criteria become highlighted as answers stream in; Summaries for different parts of the doc that is in view can stream in; the system can send parallel requests to summarize different parts of the doc and have them all streaming back in parallel.

Still further features include pop-up text and hidden content that may be generated by the GLM in subsequent passes on-demand as needed. Interaction with certain parts of the page can trigger additional streaming requests; special tokens can be injected into the streaming response for a single prompt to direct the model to STOP processing the last section/request and start streaming tokens for a new section of the large response. E.g., a response may have several search results and their summaries such that a first pass may only generate 100 tokens for each of 10 summaries. If user hovers over (or clicks on) summary 2, the generation can be updated with ACTION-HOVER-2 to start generating more tokens for summary 2. This is akin to a UI metadata dialogue with the page (streaming model results) that is behind the scenes to the user. This metadata may include tokens or soft tokens (embeddings (e.g., user context changes)) that are injected as the streaming progresses. Other actions can include the user clicking on certain other parts of the page as the bot is generating text/voice that help refine user intent.

In another embodiment, dynamic real-time response alteration by the GLM 112 based upon user feedback is provided. As a result is streaming back in text or voice, the user can interject with "Tell me more about X", or "make it more about Y" to direct the subsequent response in real-time. The user can use text, voice or other methods (gaze tracking, user nodding or shaking head, user emotion tracking with vision (smile, frown, etc.), EEG, user performing certain actions in Windows/Edge/Page (e.g., user asks for help on something, bot starts explaining how, user then figures it out, bot says, "oh I see you've figured it out", etc.)) to convey updated intentions to the system. This feature saves on further computation of the earlier response.

According to an example dialog:
Bot: "There are many breeds of cattle that are raised for various purposes, including milk production, meat production, and draft work. Some of the main breeds of cattle include:
1. Holstein: This breed is known for its high milk production and is the most common breed of dairy cows.
2. Jersey: This breed is known for its high butterfat content in its milk and is a popular breed for dairy production.
3. Angus: This breed is known"
User: "Tell me more about Holsteins"

The voice model and text model have adaptive ways to cut short the speech or text in a graceful manner so that the new request can be processed, in contrast to an abrupt stop. A smaller, faster model/prompt may be used to generate fast transition responses while the model searches and composes a new response, such as "Holsteins? Ah Yes, a great breed . . . " . . . "Wikipedia says that they are typically black and white . . . ". Additionally, the bot response can be broken up into multiple smaller bubbles to reduce TTS latency.

Other features include the ability to rephrase for responsible artificial intelligence (RAI). For cases where RAI has triggered, similar adaptive responses can be used while the system regenerates a more desired response. The system may also stream backwards—i.e., use the backspace key—if it detects that it needs to restate something that was already displayed. This is may be challenging for voice, in which case the system can say "Oops, I meant . . . ; here is a better answer . . . " or some other phrase to correct its errors. The client-side buffer of speech can be large enough that these corrections can happen before they R heard/seen by the user. Instead of rephrasing, the bot can decide not to answer or answer with a more generic/safe response that can be predefined.

With regard to adaptive aggregation, if the GLM 112 determines it has enough evidence to support a fact, it can stop making background search requests for more information. In database aggregations, or in general in streaming statistics, once the model has sufficient evidence sampled from a IID distribution, it can state an answer with specific confidence bounds. Once certain bounds are achieved, the model can stop processing. Similarly, an active information agent can stop once it has convincing evidence for the answer to a specific subproblem.

With regard to dynamic updating of the ranked list of results, asynchronous chatbot requests are provided, where for example, an answer comes back at a later time, introduced via conversation or a list of tasks and their progress. In another example, the system can stop processing requests that the user has scrolled out of view. The system can speculatively start streaming results that are outside of the current view port if the user is likely to scroll towards them.

According to another feature, eye-tracking is used to decide where to focus generation budget. E.g., the system determines answers to questions such as: More text tokens needed for this paragraph? What generation rate is best? How fast can users read/absorb? Can information retention be increased with appropriate speed, pauses, etc.

In another embodiment, input is streamed to the GLM 112 as the user types. The model can already figure out what the user wants and give an answer more quickly. It can also auto-complete user sentences (auto-complete the question and show a tentative answer if the user were to accept that completion). E.g. "how tall is Barack Obama? Answer: Barack Obama is 6'1". He served as the 44th president of the United States . . . ".

A bot can actively stream the summaries of k real time streams (meetings, videos, audio, chat, other event streams (sporting events, TV shows, etc.)) in less than real time. Hence, a user can attend the activities of k meetings that are happening simultaneously. A dashboard of live semantic summaries can also be provided. Summaries can include text and various visual elements. Summaries can include compressed clips of the most interesting recent moments in a basketball game. This feature can permit a user to watch 10 games at once and don't miss anything interesting or to serve 10 customers via a text-based chat support at the same time.

The model can start looking at its own output as it is being generated to Initiate additional background processes: e.g., RAI (responsible AI classifiers), fact checking processors, etc. This can happen token by token, at sentence boundaries, etc. this feature applies to multi-modal generation (text, images, video, speech, etc.). There is also provided a buffer to call downstream models with output and retrieve feedback from the downstream model before the user sees it. If RAI detects an issue, it can dynamically send that feedback to the streaming output/input of the first model so that the response changes in a more desired way. There can be many simultaneous generating process that incorporate these near real-time feedback signals.

There also may be a complex workflow of streaming data coming into the model(s). Ads generated by one expensive model can be streamed into a second prompt running on an expensive model that is also streaming. The page may visually show multiple streams from different models and model calls. Similarly to the above, some of these streams may be internal and only seen by other models.

Pipelining of multiple prompts enables a chain of n prompts to be rendered in t time instead of t*n time where t is the full generation time. At the hardware and system level we allow multiple standing queries to communicate with each other. Given two prompts a, b where b depends on output of a, both prompts can start loading in parallel. As output from a arrives, it can be appended/loaded into b and b can start generating once enough has been received.

There may be hotspots where certain experts in the Mixture of Experts (MoE) model are overloaded. Parallel copies of the expert can be made to improve throughput. Moreover, distilled models can be employed that are specialized with respect to their functionality while requiring less computational resources (and sometimes time) when compared to general purpose GLMs. For instance, a distilled GLM can be configured to perform text summarization (but not generate queries). Another distilled GLM can be configured to generate queries (but not perform text summarization).

For content that is generated iteratively, such as diffusion models, intermediate steps in the computation may be streamed. For instance, during streaming of an image, a single image may start out as white noise but then sharpen into a picture of a cat as the model iterates.

Outpainting approaches may also stream. If the user pans an image the model may start out-painting a missing area, generating new details that are consistent with the original image. Similarly for image zoom, the zoomed image may be streamed in.

Generated text for writing assistance may also be streamed in. The streaming may occur within a sentence or between existing paragraphs, etc. This is an example of textual "inpainting" where there is a region that the user wants to fill in with the model. The user can initiate multiple simultaneous requests. E.g., "Add a paragraph on health issues with bulldogs after the paragraph on the cost of dog breeds."; "Add an introductory paragraph that this is a buying guide for dog breeds.". These can be streamed in simultaneously.

There can be many UI elements that indicate when the bot or page is working on something. " . . . " or "I am thinking" or "searching for x" or "looking up prices" or "finding you the best deal". This description of what the system is doing can be generated by the model and be conditional on the query/task.

There can be more than two participants in a conversation and potentially more than one bot. This feature can address situations with a long prompt and long response, instead of having timeout and throw away all partially generated tokens, the system can use the partial outputs and make the job complete.

In another embodiment, a "home page" SERP is provided, which provides an experience that is like watching a TV news show where the user can interact with the news anchors. For instance, the news anchors can be represented as dynamically generated avatars that are being generated in near-real time. Transitions between queries can be animated, such as "now switching to the weather report" when the user asks about weather. The system can ask the user questions to help direct the interactive broadcast. In this regard the system acts as a virtual operating system where the user can ask for different information to be displayed, summarized, etc. Some jobs may require a long time to process, in which case the system can say, "now back that question about the cows . . . " transitions. The stream can include metadata for synchronization with other streams. E.g., tone of voice, facial expressions, style, etc. which can be input to other widgets, models, avatars or renderers that process or combine one or more streams. E.g., there can be a cue to flip to a certain ad as a particular sentence is being rendered. The page can also have multiple open connections to pull different streams. Some of the streaming can happen on the client, some stream processing on the server.

Figure 5:
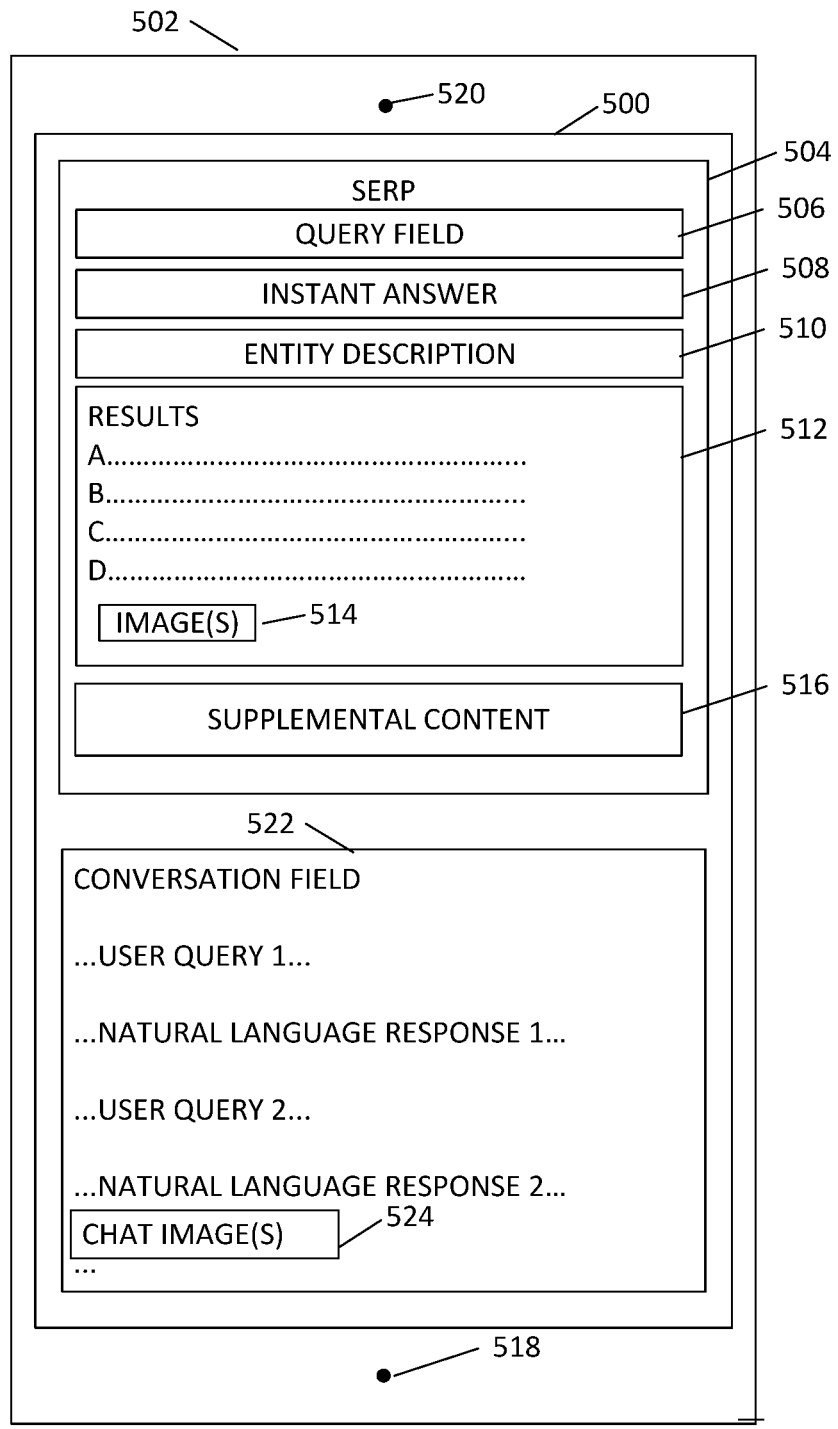
FIG. 5 shows a GUI on a communication device, such as a tablet, cell phone, smartphone, etc., in accordance with one or more aspects described herein.

With reference now to FIG. 5, a GUI 500 is illustrated on a communication device 502, such as a tablet, cell phone, smartphone, etc., in accordance with one or more aspects described herein. The GUI 500 comprises a SERP interface 504 that includes a query field 506, an instant answer field 508 (when applicable), an entity description field 510 (when applicable), and a results field 512. In the results field 512 are displayed one or more results (labeled A through D) returned in response to a query entered into the query field 506 and optionally one or more images 514. The user clicks on one of the returned results A-D, and the device displays the received information associated with the selected result. Additionally, the system retrieves supplemental content 516 (e.g., additional articles, hyperlinks, images, ads, etc.) related to the selected result, and displays the supplemental content on the SERP interface 504.

It will be understood that the particular order in which the query field 506, instant answer 508, entity description 510, results field 512, and supplemental content field 514 is not limited to that depicted in FIG. 5, but rather these elements may be arranged in any order. Furthermore, the depicted elements in the SERP interface 504 are not limited to a stacked arrangement as shown in FIG. 5, but rather may be arranged side by side, in a grid arrangement, etc.

The communication device 502 further comprises a microphone 518 and one or more speakers 520 via which the user can enter voice commands and receive audio from the communication device. For example, the user may initiate a query by saying the word "query" or "question" to activate the microphone, followed by words or phrases that the user might otherwise enter manually into the query field 506. The results field 512 can be populated with results (e.g., hyperlinks, article titles, images 512, etc.) responsive to the user's voice query. In another embodiment, the results can be read out and presented to the user via the speaker(s) 520 as audio output.

In another embodiment, a voice activation graphical icon (not shown) can be provided in the query field 506 or elsewhere in the SERP interface 504. Upon selection (e.g., tap or long press) of the voice activation graphical icon by the user, the user is prompted to begin speaking and can speak a natural language query into the microphone 518. One or more of the returned instant answer 508, entity description 510, results 512, and/or supplemental content 514 can be presented to the user as audio output via the one or more speakers 520.

The GUI further comprises the conversation field 522 that shows a conversation between the user and the GLM and/or search engine. Included in the conversation field 522 or user queries and respective natural language responses, along with one or more chat images 524 (i.e., images included in the chat or conversation field).

In another embodiment, the surf 504 displayed on the GY500 is a semantic SERP, such as the semantic SERP 406 described with regard to FIG. 4.

Figure 6:
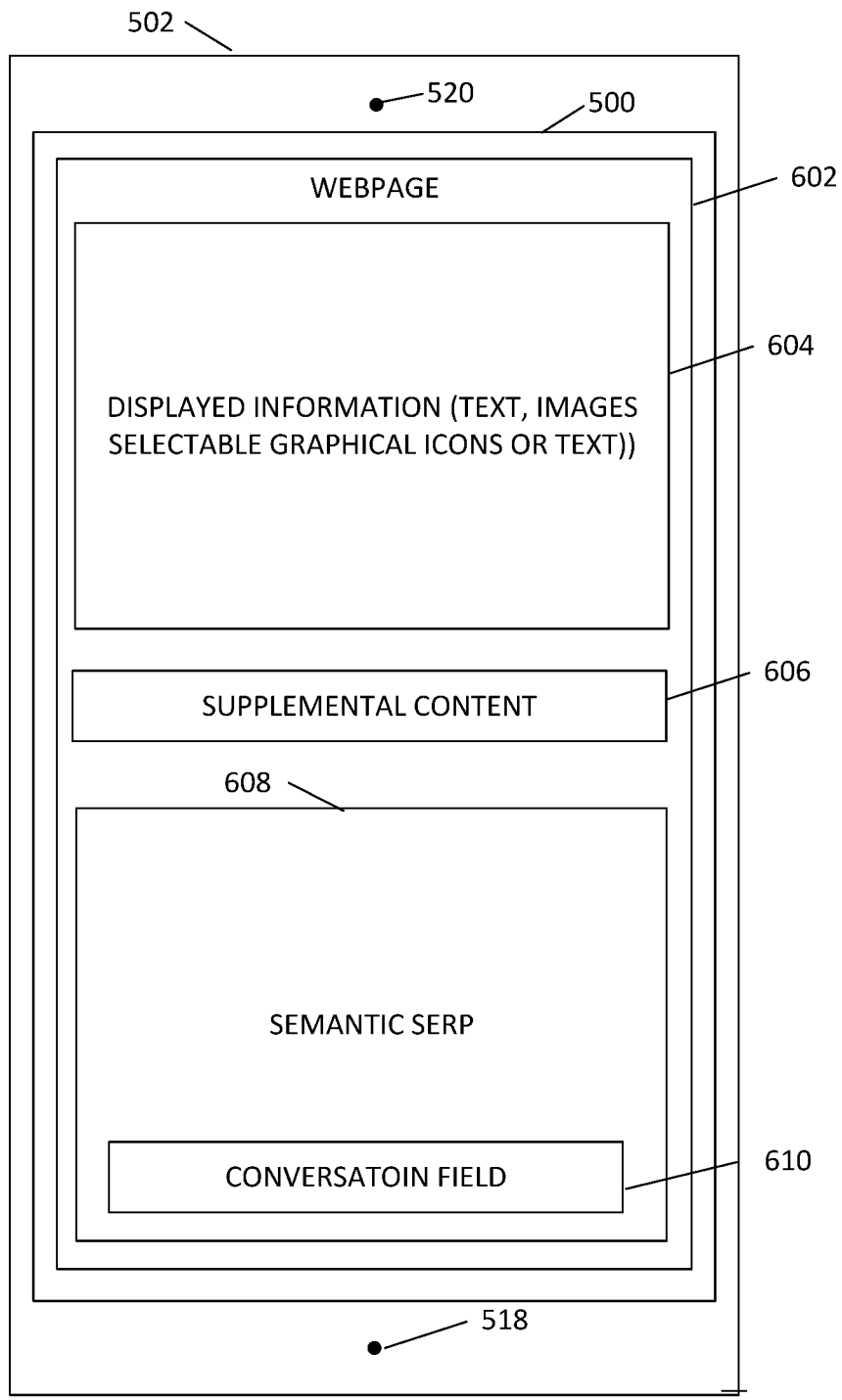
FIG. 6, shows a GUI displaying a web page with a streaming SERP overlaid thereon, in accordance with one or more aspects described herein.

With reference now to FIG. 6, shown on the GUI 500 of the communication device 502 is a web page 602 comprising information 604 that is displayed, and which comprises text, images, selectable graphical icons, selectable text, etc.

Also illustrated as supplemental content 606, and a semantic SERP 608. The semantic SERP 608 may be similar or identical to the semantic SERP 406 described with regard to FIG. 4. The supplemental content 606 can be retrieved based on indicated user interest in information provided in the semantic SERP The user is also permitted to have a text or voice conversation they showed in a conversation field 610 of the semantic SERP. The user queries and the natural language responses generated by the system are displayed to the user in the conversation field 604 as a dialog. An example of a conversation dialog that can be displayed in the conversation field 610 (or the conversation field of any of the preceding figures) is provided below.

QUERY 1: In what state is Ann Arbor located?
RESPONSE 1: Ann Arbor is located in the state of Michigan, United States.
QUERY 2: Tell me more.
RESPONSE 2: Ann Arbor is a city in the southeastern region of Michigan, located about 35 miles (56 K m) West of Detroit. It is the county seat of Washtenaw County and is known for being home to the University of Michigan, one of the oldest and most prestigious public universities in the United States.
QUERY 3: What SAT score does the University require?
RESPONSE 3: The University of Michigan requires that students submit SAT scores as part of their application. For the SAT, the middle 50% range for the class of 2025 was 1340 to 1470.

As can be seen the responses generated by the system take into account the context of the conversation. For instance, when the user refers to "the University" in query 3, the system deduces that the user is referring to the University of Michigan based on the context of Response 2. The communication device 502 also comprises the microphone 518 and one or more speakers 520, which permit the user to speak the queries and listen to the responses during the conversation as described above with regard to FIG. 5.

The supplemental content 610 is retrieved using the context of the conversation and can comprise additional links, images, selectable graphical icons, etc., on which the user can click for additional information. For example, the content may include links to one or more hotels in the Ann Arbor area, restaurants in Ann Arbor, to buy tickets to University of Michigan sporting events, etc. without being limited thereto.

Figure 7:
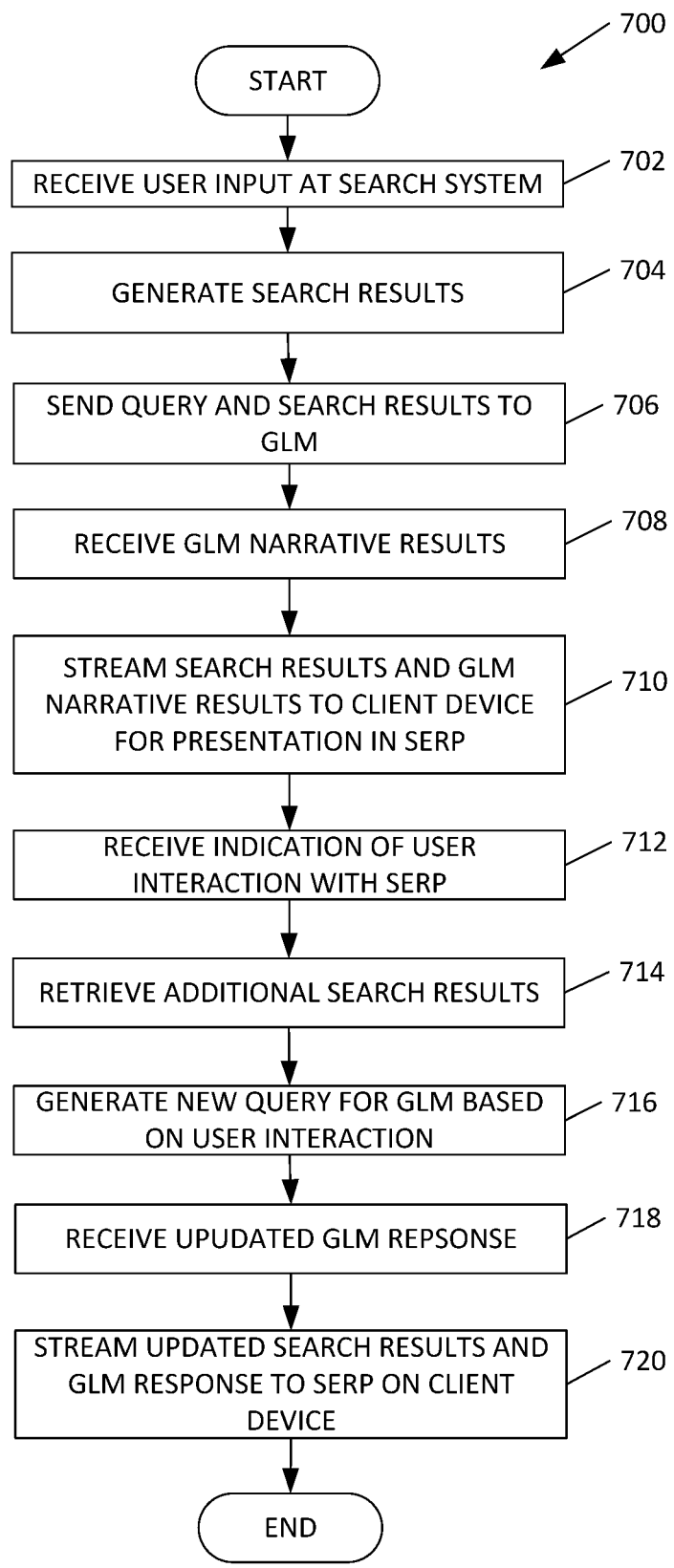
FIG. 7 illustrates a flow diagram depicting a method 700 for providing a streaming experience in a SERP in a computing system, in accordance with one or more aspects described herein.

FIG. 7 illustrates a methodology relating to providing streaming information within a SERP, in accordance with one or more embodiments described herein. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning now to FIG. 7, a flow diagram depicting a method 700 for providing a streaming experience in a SERP in a computing system, in accordance with one or more aspects described herein. At 702, user input is received at a search system. At 704, search results are generated for the user query. At 706, the query and the generated search results are sent to the GLM. At 708, GLM narrative results based on the query and the provided search results are received. At 710, the search results and the GLM narrative results are streamed to the client device for presentation in the SERP.

At 712, an indication of user interaction with the SERP is received. The user interaction may be a user click on a selectable icon, word, or phrase presented in the SERP, or may be a user voice commands such as "tell me more about that" during a particular portion of the streaming data as it is first streamed into the SERP. At 714, additional search results are retrieved based on user interest as determined by the indication of user interaction with the SERP. At 716, the new queries generated for the GLM based on the user interaction. At 718, updated GLM response narrative is received. At 720, the updated search results and updated GLM response narrative are streamed to the SERP on the client device.

With continued reference to FIGS. 1-7, various additional contemplated features and aspects are described below. In one embodiment, streaming HTML can include multimedia (MM) content. The MM content may itself be generated by a GLM and may stream in as it is generated, e.g., starting from an image of white noise to a finely-detailed image. The SERP may be an entire page with many sections and/or multiple elements may be integrated into a dialogue response as shown above. Some initial content may be generated that is in view, but additional content may continue to stream in and get displayed as the user scrolls down or otherwise interacts with the UI.

The results from multiple paragraphs can stream in in parallel. As the user scrolls one paragraph out of view, it can stop streaming in, saving GPU resources. The user is still able to scan over the initial sentences of multiple results quickly. Priority signals for various streams may be sent dynamically to the models to prioritize GPU capacity for more important streams. Certain streams may be paused, deprioritized, or canceled.

Users can switch to different streams with certain widgets, e.g., "next page" for text and image result. The system can also auto-switch to give the user a preview of first lines of each page.

The system caches results for quicker search and retrieval. There may be an animated icon/avatar of the system "thinking" while retrieving results. Status of subtasks progress can be streamed in to show progress to the user. Certain parts of the page may load fast, while other parts stream in. A whole-page optimizer controls the display of streaming results to avoid a jarring UX where results keep moving on the user.

A classifier can be employed that determines which model to use. Some responses may not merit an expensive model and can be served by a lower-latency model.

In another embodiment, a workflow engine (not shown) is provided for parallelizing tasks. E.g., Map Reduce, a job optimizer (not shown) that determines what tasks or operations can be run in parallel.

Also contemplated are prompts that can generate extensions, come to a checkpoint, insert newly arrived streaming content, continue generating, etc. This feature allows for out of order arrival of inputs to the prompt templates.

The described systems and methods can also provide for adaptive refinement from certain models: e.g., images that are iteratively generated, videos that are generated frame by frame, music generated on the fly, voice generated on the fly, Excel-like tables where each aggregate cell is populated asynchronously, a dependency graph between cells where certain cells can extract, summarize, etc., Map-Reduce dependency graph, workflow engine, etc.

In another example, the model itself can be used to plan/optimize/schedule the workflow, including running tasks in parallel and asynchronously, and for deciding what sub-prompts to call.

In another example, the system can generate a voice conversation that uses k different voices. This feature facilitates providing certain experiences to the user, such as holding dueling news broadcasters or podcast interview simulation, providing two points of view read by different bot speakers, narrating a story with k-different characters who speak differently, providing multi-media video content with multiple speakers. This feature also facilitates providing adaptive ability for bot2 to interrupt bot1 mid-sentence with a fully context-sensitive interjection.

The system can also permit for text displayed to be more verbose/detailed, while voice only speaks a brief summary of the content (that may not appear on the screen). E.g., a mixed mode result that includes text (whole page)+voice overview of the content.

In another example, the system provides for streaming results in the sidebar as the user navigates while facilitating zero-shot suggestions, commentary, recommendations, etc.

The system provides the ability to attend k virtual meetings simultaneously and can employ summarization to shorten the real-time content (as text or voice summaries) so the user can attend to multiple meetings in parallel. This feature can extend to watching k TV channels, k sporting events. There can be seamless stitching of the narration when switching between running commentary on different event streams.

According to another aspect, the system can synchronize current streaming content from model with simultaneous next instruction that the user is issuing. For instance, if the user starts talking about something that is still streaming, when the GLM 112 generates the next response, it can use the synchronization information to infer what "that one" means i.e., what the user was seeing stream by at that time at the time the user said, "that one". This feature can apply to any streaming content—text, video, etc. In one embodiment, this functionality is provided by the synchronization module 208 (FIG. 2).

In another embodiment, the system provides for adaptive streaming. E.g., the user hovers over a certain image. The overview narration can capture that event and then like a salesperson or teacher can adapt the near-real-time subsequent commentary of the page to focus on what the user is attending to. The user can attend to things via any human-computer interface methods.

Certain features apply to augmented reality commentary as well. The SERP can be overlayed in VR or AR. There can be a continuous stream of "query" such that the model is always accumulating context and adapting its generated content/commentary. The grounded edge side bar can also extend to grounding on VR/AR content.

In another embodiment, the system provides streaming "summaries" of event streams, such as updating the log plot of a finance ticker. A model can perform the streaming log computation of the raw input stream. The running generated tokens from the prompt can be checkpointed to generate a histogram, where the last unfilled bucket shows the most recent data points. Once a bucket window passes, the most recent data points are aggregated, and the generation/prompt is set back. In this regard, the operation is similar to a read-write prompt. E.g., [1,2,3,4], 5, 6=>[1,2,3,4], [5, 6, 7, 8], 9, 10=>etc. Checkpoints can be stored on the prompt/generated continuation.

In another example, when listening to k meetings, the user can select which streams the user wants to actively listen to in voice or text and which ones the user does not want to attend to. The combined summary stream can tell the user more about the subset the user is most interested in and occasionally tell the user a higher-level summary of what is happening in the other stream. This feature can also apply to asynchronous information requests that the system is processing. E.g., when the user asks the system to research k things, and the system has generated k' subtasks, the system can give the user summaries of the k things the system is doing. I.e., the system can tell the user how things are progressing, what the system is thinking about doing next, etc. The user can guide the system as to where to direct its attention and search/processing.

When generating a response, the system is aware of how much time the user has to view the response (e.g., whether the user is busy, driving, what device are the user is on, etc.). The system can generate a response of appropriate length, as well as high level summaries, ask the user where the user prefers more expansion, etc. For those places where the system anticipates the user might ask for more details, it can already start pre-generating responses.

The system can give a continuous commentary over a basketball or soccer game. It can listen to an AM radio station, do speech to text, then generate a more interesting, stylized, shortened commentary, etc. It can listen to k different stations talking about the same event and integrate the commentary. It can continuously tell the user about the stock market, the stocks the user is interested in, different industries, any other news stories the user is interested in, any other world news or events that are happening, etc. It can create a personalized Bloomberg TV station for the user. It can generate dynamic information mixtures of answer types. E.g., charts, text, speech, etc. It can dynamically watch/mix video content being streamed on k TV or media sources.

In another example the user is given an option to provide feedback about the quality or helpfulness of search results and or chat dialog narrative, such as a "thumbs up" or "thumbs down" response, a rating (e.g., scale of 1-5) etc.

In another embodiment, the user is able to submit as a query a URL or the like and ask the system to summarize its content. The system then analyzes the content of the URL and returns a streaming summary of the contents to the user. Similarly, the user can initiate the chat feature while reading email and ask the system to summarize the contents of the email or a document associated therewith.

Other features include voice driven search, visual question answering over visual content, bot-labeled commentary on objects on the page, (icon plus commentary), voice commentary on user interactions with page elements, adaptive generation based on user interactions and attention, dialog driven interactions with content on the SERP page, wrapper or right rail-overlay, interactions with other UIs for other content (email search, SharePoint search etc.).

Additional features can include dialog driven interactions with the dynamically generated web page; dynamic layout rearrangement; dynamic edition of elements into the conversation history; full page transition from dialog elements in conversation; weather element in conversation; the ability to click on an answer card to switch back to full page portal/detailed/non-mini version of the element; the ability to switch between in-conversation elements and full-experience modes; etc. For example, the user can switch from a shopping answer to a full-page shopping page. Other features include answer/exploded views; the ability to put answers in conversation aside; to pin them; to put them in a new browser tab, etc. Additionally, an "expand" button can be provided for answers that have an alternative expanded mode to switch to.

Additionally, an option is provided for a multi-page conversation. For example, a given model state can include dialog/interactions across multiple tabs/pages/searches.

Other features include the ability to have content of a full news article shown as an answer added to the dialog context. For instance, the system can fetch a news article, but show only a headline and an image of the news article. In this scenario, the user can ask a next question that leverages the full content of the news article and/or prioritizes fetching the content to generate the next response.

In another embodiment, search results in conversation mode can be delivered as a web result answer card and/or a semantic summary answer card.

The described systems and methods also provide the ability to share conversation with others, allow multi-party conversations, save conversations for later resumption, bookmark conversations, save full dialog history for later review, timestamp dialog conversation so that a next response can leverage recent conversation history across multiple windows/conversations, share turns of a conversation widely (e.g., on social media), integrate mixed-mode external content/dialog into Enterprise chat applications (e.g., Teams, Skype), provide upsells into the Sapphire app experience, etc.

In another example, the described systems and methods facilitate providing a "new tab page" including one or more of a "what's new" summary, asynchronous updates on what is happening regarding user data, user interests, what is happening in the world, etc. Email can be another experience where a mini answer/expanded/full-page mode are provided. For email, the sub-answers can be individual emails, info about people, people answers/cards, etc. "Expand" mode can launch a new window or tab for composing/sending an email reply. Answers can include a short list of relevant emails, or SharePoint items. Expand mode can also transition to a full-page Word document for a document result. There also is contemplated an option to switch back to conversation with mini-answer mode.

Figure 8:
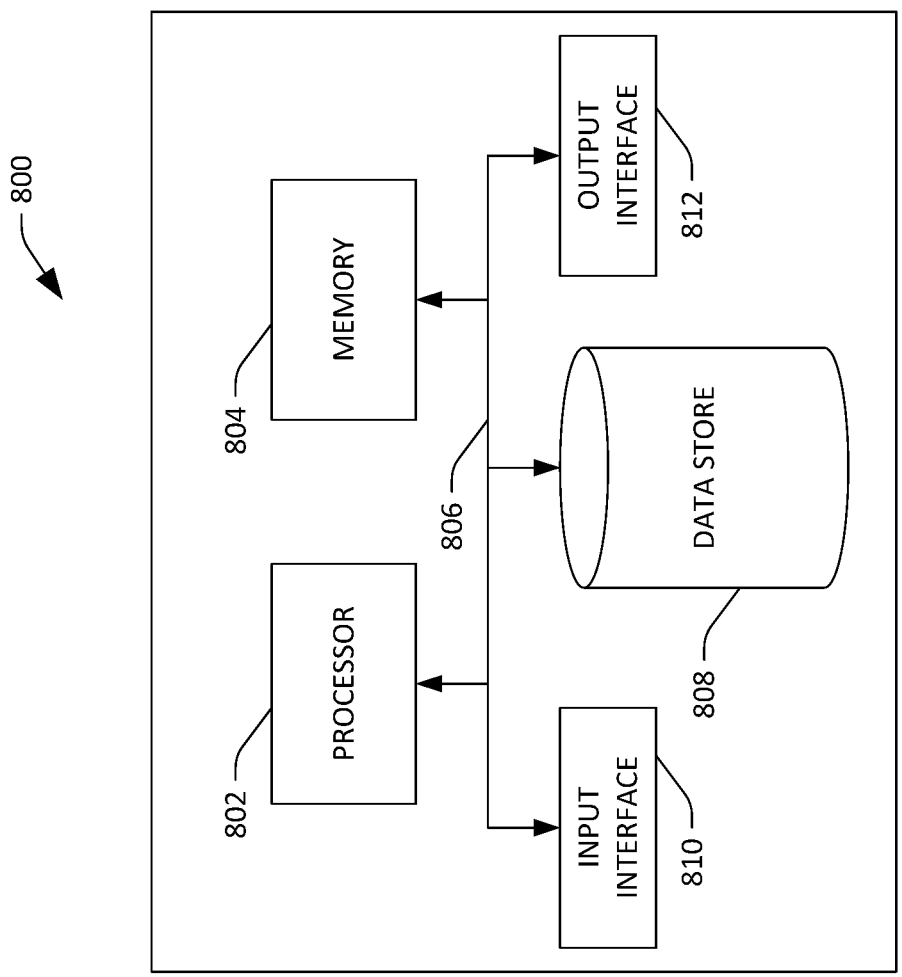
FIG. 8 shows a high-level illustration of an exemplary computing device that can be used in accordance with the systems and methodologies disclosed herein.

Referring now to FIG. 8, a high-level illustration of an exemplary computing device 800 that can be used in accordance with the systems and methodologies disclosed herein is illustrated. For instance, the computing device 800 may be a client computing device that has an operating system stored thereon, where the operating system provides a streaming functionality for presenting a SERP to a user on a client device. By way of another example, the computing device 800 can be a server computing system that provides the streaming search presentation functionality. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store content, graphical icons, profile information, etc.

The computing device 800 additionally includes a data store 808 that is accessible by the processor 802 by way of the system bus 806. The data store 808 may include executable instructions, graphical icons, profile information, content, etc. The computing device 800 also includes an input interface 810 that allows external devices to communicate with the computing device 800. For instance, the input interface 88 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above can also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Described herein are various technologies according to at least the following examples.

(A1) In an aspect, a computing system is described herein. The computing system comprises a processor, and memory storing instructions that, when executed by the processor, cause the processor to perform acts. The acts comprise receiving a query provided by a user and generating a prompt that is to be input to a generative language model, where the prompt includes an instruction for the generative language model to generate conversational output based upon the query. The acts further comprise providing the prompt as input to the generative language model, wherein the generative language model generates conversational output based upon the prompt. The acts also comprise streaming the conversational output to one of a search engine results page (SERP) or webpage to which the user has navigated from the SERP, such that the conversational output appears to the user as though it is being typed in real time.

(A2) In some embodiments of the computing system of (A1), generating the prompt further includes providing a search system with the query, wherein the search system identifies search results based upon the query and includes a portion of the search results in the prompt.

(A3) In some embodiments of the computing system of (A2), the acts further include receiving an indication of user interaction with the SERP responsive to the conversational output. The acts also comprise retrieving additional search results in response to the user interaction. Moreover, the acts comprise generating and transmitting to the generative language model an updated prompt based on a portion of the additional search results and the user interaction. The acts further comprise receiving updated conversational output from the generative language model. Additionally, the acts comprise streaming the updated search results and the updated conversational output to the SERP on the computing device.

(A4) In some embodiments of the computing system of at least one of (A1)-(A3), the acts further comprise providing supplemental content related to the conversational output for display on a dynamically updatable display pane on the computing device. The acts also comprise updating the supplemental content responsive to at least one of additional user interaction and updated conversational output.

(A5) In some embodiments of the computing system of (A4), the acts further comprise synchronizing streaming of the supplemental content to the conversational output by comparing metadata associated with the conversational output and the supplemental content.

(A6) In some embodiments of the computing system of at least one of (A1)-(A5), the acts further comprise identifying offensive content in at least one of the conversational output and the supplemental content. The acts also comprise, prior to rendering, at least one of: removing the offensive content; and removing the source of the offensive content.

(A7) In some embodiments of the computing system of at least one of (A1)-(A6), the acts further comprise caching generative language model responses for retrieval in response to similar queries.

(B1) In another aspect, a computing device is described herein. The computing device comprises a processor, and memory storing instructions that, when executed by the processor, cause the processor to perform acts. The acts comprise transmitting a user query to a search system. The acts further comprise receiving conversational output from a generative language model, where the generative language model generated the conversational output based upon a prompt comprising the query. The acts also comprise streaming the conversational output on one of a search engine results page (SERP) or webpage to which the user has navigated from the SERP, such that the conversational output is presented to a user as though it is being typed in real time.

(B2) In some embodiments of the computing device of (B1), the conversational output comprises information related to search results responsive to the query.

(B3) In some embodiments of the computing device of at least one of (B1)-(B2), the acts further comprise transmitting an indication of user interaction with the SERP responsive to the conversational output. The acts also comprise receiving updated search results and updated conversational output in response to the user interaction.

(B4) In some embodiments of the computing device of (B3), the acts further comprise displaying streamed updated search results and updated conversational output on the SERP.

(B5) In some embodiments of the computing device of at least one of (B1)-(B4), the acts further comprise receiving and displaying supplemental content related to the conversational output on a dynamically updatable display pane on the SERP. The acts also comprise receiving and displaying updated supplemental content responsive to at least one of additional user interaction and updated conversational output.

(B6) In some embodiments of the computing device of (B5), the acts further comprise synchronizing streaming of the supplemental content to the conversational output by comparing metadata associated with the conversational output and the supplemental content.

(B7) In some embodiments of the computing device of at least one of (B1)-(B6), the acts further comprise. The acts also comprise identifying offensive content in at least one of the conversational output and the supplemental content. Additionally, the acts comprise, prior to rendering, at least one of: removing the offensive content; and removing the source of the offensive content.

(C1) In another aspect, a method performed by a computing system is described herein. The method facilitates providing conversational interaction on search engine results page presented on an interface of a computing device. The method comprises receiving a query provided by a user. The method further comprises generating a prompt that is to be input to a generative language model, where the prompt includes an instruction for the generative language model to generate conversational output based upon the query. The method also comprises providing the prompt as input to the generative language model, wherein the generative language model generates conversational output based upon the prompt. Additionally, the method comprises streaming the conversational output to one of a search engine results page (SERP) or webpage to which the user has navigated from the SERP, such that the conversational output appears to the user as though it is being typed in real time.

(C2) In some embodiments of the method of (C1), generating the prompt further includes providing a search system with the query, wherein the search system identifies search results based upon the query and includes a portion of the search results in the prompt.

(C3) In some embodiments of the method of (C2), the method further includes receiving an indication of user interaction with the SERP responsive to the conversational output. The method also includes retrieving additional search results in response to the user interaction. The method further includes generating and transmitting to the generative language model an updated prompt based on a portion of the additional search results and the user interaction. Moreover, the method comprises receiving updated conversational output from the generative language model. Additionally, the method includes streaming the updated search results and updated conversational output to the SERP on the computing device.

(C4) In some embodiments of the method of at least one of (C1)-(C3), the method further comprises providing supplemental content related to the conversational output for display on a dynamically updatable display pane on the computing device. The method further comprises updating the supplemental content responsive to at least one of additional user interaction and updated conversational output.

(C5) In some embodiments of the method of (C4), the method further comprises synchronizing streaming of the supplemental content to the conversational output by comparing metadata associated with the conversational output and the supplemental content.

(C6) In some embodiments of the method of at least one of (C1)-(C5), the method further comprises identifying offensive content in at least one of the conversational output and the supplemental content. The method also comprises, prior to rendering, at least one of: removing the offensive content; and removing the source of the offensive content.

(D1) In another aspect, a method performed by a computing device is described herein, wherein the method comprises any of the acts set forth in embodiments (B1)-(B7).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
a processor; and
memory storing instructions that, when executed by the processor, cause the processor to perform acts comprising:
receiving a query provided by a user;
generating a prompt that is to be input to a generative language model, where the prompt includes an instruction for the generative language model to generate conversational output based upon the query;
providing the prompt as input to the generative language model, wherein the generative language model generates conversational output based upon the prompt;
streaming the conversational output to a search engine results page (SERP) in a chat window, such that the conversational output appears to the user as though it is being typed in real time in the chat window;
receiving an indication that a search result in the SERP has been selected by the user; and
causing a webpage corresponding to the selected search result to be displayed, wherein the chat window is caused to be maintained on the webpage.

2. The computing system of claim 1, wherein generating the prompt further includes providing a search system with the query, wherein the search system identifies search results based upon the query and includes a portion of the search results in the prompt.

3. The computing system of claim 2, wherein the acts further include:
receiving an indication of user interaction with the SERP responsive to the conversational output;
retrieving additional search results in response to the user interaction;
generating and transmitting to the generative language model an updated prompt based on a portion of the additional search results and the user interaction;
receiving updated conversational output from the generative language model; and
streaming the updated search results and the updated conversational output to the SERP on the computing device.

4. The computing system of claim 1, the acts further comprising:
providing supplemental content related to the conversational output for display on a dynamically updatable display pane on the computing device; and
updating the supplemental content responsive to at least one of additional user interaction and updated conversational output.

5. The computing system of claim 4, the acts further comprising:
synchronizing streaming of the supplemental content to the conversational output by comparing metadata associated with the conversational output and the supplemental content.

6. The computing system of claim 1, the acts further comprising;
identifying offensive content in at least one of the conversational output and the supplemental content; and
prior to rendering, at least one of:
removing the offensive content; and
removing the source of the offensive content.

7. The computer system of claim 1, the acts further comprising:
caching generative language model responses for retrieval in response to similar queries.

8. A computing device comprising:
a processor; and
memory storing instructions that, when executed by the processor, cause the processor to perform acts comprising:
transmitting a user query to a search system;
receiving conversational output from a generative language model, where the generative language model generated the conversational output based upon a prompt comprising the query; and
streaming the conversational output on a search engine results page (SERP) in a chat window, such that the conversational output is presented to a user as though it is being typed in real time in the chat window;
receiving an indication that a search result in the SERP has been selected by the user; and
causing a webpage corresponding to the selected search result to be displayed, wherein the chat window is caused to be maintained on the webpage.

9. The computing device of claim 8, wherein the conversational output comprises information related to search results responsive to the query.

10. The computing device of claim 8, wherein the acts further include:
transmitting an indication of user interaction with the SERP responsive to the conversational output;
receiving updated search results and updated conversational output in response to the user interaction.

11. The computing device of claim 10, the acts further comprising:
displaying streamed updated search results and updated conversational output on the SERP.

12. The computing device of claim 8, the acts further comprising:
receiving and displaying supplemental content related to the conversational output on a dynamically updatable display pane on the SERP; and
receiving and displaying updated supplemental content responsive to at least one of additional user interaction and updated conversational output.

13. The computing device of claim 12, the acts further comprising:
synchronizing streaming of the supplemental content to the conversational output by comparing metadata associated with the conversational output and the supplemental content.

14. The computing device of claim 8, the acts further comprising;
identifying offensive content in at least one of the conversational output and the supplemental content; and
prior to rendering, at least one of:
removing the offensive content; and
removing the source of the offensive content.

15. A method that facilitates providing conversational interaction on search engine results page presented on an interface of a computing device, the method comprising:
receiving a query provided by a user;
generating a prompt that is to be input to a generative language model, where the prompt includes an instruction for the generative language model to generate conversational output based upon the query;

providing the prompt as input to the generative language model, wherein the generative language model generates conversational output based upon the prompt;

streaming the conversational output to ene of a search engine results page (SERP) in a chat window, such that the conversational output appears to the user as though it is being typed in real time in the chat window;

receiving an indication that a search result in the SERP has been selected by the user; and causing a webpage corresponding to the selected search result to be displayed, wherein the chat window is caused to be maintained on the webpage.

16. The method of claim 15, wherein generating the prompt further includes providing a search system with the query, wherein the search system identifies search results based upon the query and includes a portion of the search results in the prompt.

17. The method of claim 16, wherein the acts further include:

receiving an indication of user interaction with the SERP responsive to the conversational output;

retrieving additional search results in response to the user interaction;

generating and transmitting to the generative language model an updated prompt based on a portion of the additional search results and the user interaction;

receiving updated conversational output from the generative language model; and streaming the updated search results and updated conversational output to the SERP on the computing device.

18. The method of claim 15, the acts further comprising:

providing supplemental content related to the conversational output for display on a dynamically updatable display pane on the computing device; and updating the supplemental content responsive to at least one of additional user interaction and updated conversational output.

19. The method of claim 18, the acts further comprising:

synchronizing streaming of the supplemental content to the conversational output by comparing metadata associated with the conversational output and the supplemental content.

20. The method of claim 15, the acts further comprising;

identifying offensive content in at least one of the conversational output and the supplemental content; and prior to rendering, at least one of:

removing the offensive content; and removing the source of the offensive content.

* * * * *